United States Patent Office 2,910,365
Patented Oct. 27, 1959

2,910,365
PECTIN PREPARATION AND METHOD OF MAKING A TABLE JELLY

Mamie Olliver, Histon, Cambridge, England, assignor to Chivers & Sons, Limited, Cambridge, England, a British company No Drawing. Application July 1, 1957
Serial No. 668,882

Claims priority, application Great Britain July 12, 1956

9 Claims. (Cl. 99—132)

This invention is concerned with improvements in or relating to pectin compositions and more particularly compositions adapted to be made up to a table jelly, for example by the housewife.

The use of pectin for the preparation of table jellies is well-known and, for example, pectin preparations have been proposed in various forms which can be dispersed in water by boiling, the dispersion setting to a table jelly on cooling.

It is an object of this invention to provide a liquid pectin-containing composition which is adapted to be made relatively quickly into a milk-containing table jelly by the simple step of merely admixing the composition with milk at room temperature without the application of heat.

According to the invention, I provide an aqueous low methyl pectin-containing composition adapted to be made into a table jelly by simple admixture with milk without heating comprising an aqueous solution containing low methyl pectin substantially completely dispersed therein, said solution also containing sweetening and/or flavouring constituents, the pH of the said solution being within the range of from approximately 3.4 to approximately 5.5.

The term "low methyl pectin" is one well-known to those skilled in the art and denotes a pectin the methoxyl content of which is such that it gels by ionic reaction, usually in the presence of polyvalent metal ions. In distinction to this a "high methyl pectin" is a pectin the methoxyl content of which is such that the pectin gels by hydrogen bonding or like mechanism; high methyl pectins only gel in the presence of sugar and acid whilst a low methyl pectin will gel in the presence of polyvalent metal ions requiring neither sugar nor acid.

The actual methoxyl content of the low methyl pectin used in the composition according to the invention does not appear to be especially critical; a pectin with a particularly high methoxyl content may, however, give rise to a weak jelly, at the upper end of the pH range. Pectin with a low methoxyl content may also be unsatisfactory at the lower end of the pH range. I prefer in general to use pectin the methoxyl content of which is within the range of from 3–6% (as determined by the Zeisel method) and so far best results have been obtained with a pectin having a methoxyl content of approximately 5.0%; the methoxyl content is calculated on a basis of 100% calcium pectate.

Pectin powders are preferably used in the preparation of the compositions according to the invention; however, if desired one may also use liquid demethylated pectin, e.g. straight extracts of demethylated fruit tissue or fruit extracts, demethylated after extraction and from which pectin has not been precipitated. I prefer to use a pectin which has not suffered substantial chain degradation in its preparation.

The amount of low methyl pectin used will depend on the calcium tolerance of the low methyl pectin used and the gel strength required in the final milk jelly but I have found in general that a suitable amount will be within the range of from 0.8 to 1.8% (of 100% low methyl pectin) of the composition. For best results the concentration of the low methyl pectin should be adjusted by experiment according to the amount of milk which is to be mixed with the composition to form the finished jelly.

A very important feature of the compositions of the present invention is the pH value. I have found that the most suitable pH range for the compositions according to the invention lies between 4.0 and 4.5. As the pH of the composition progressively falls below 4, so the gel becomes less stable particularly with pectin of relatively low methoxyl content, and for example at pH 3.4 it is not always possible to obtain a satisfactory gel (upon mixing with milk) by simple mixing with a spoon or fork, more vigorous stirring as with an electric mixer being then necessary. At pH 3.3 even electrical mixing may fail to give a good gel. The upper limit of pH may be limited by different factors, for example the pH at which sterilisation by heat can be carried out without destruction of the pectin, i.e. approximately 4.5 for accepted fruit canning procedures, but should not in general exceed 5.5. If the pH of the composition is greater than 4.5 then preservation of the compounds should be effected by methods of preservation, other than canning, such as freezing.

The pH of the composition according to the invention may be adjusted in any convenient way for example by the simple addition of edible alkali or acid; whilst it is not essential that the composition be buffered, I do prefer to have present a buffer salt in order to ensure that the pH of the composition remains in the specified range. Buffer salts have also in some cases been known to affect the rate of gelling of the composition and thus for good results it is best to select a suitable buffer by experiment according to the particular composition to be made. It will be noted that, for example as mentioned below, the nature of the fruit juice or other flavour added will affect the pH and/or electrolyte content and may thus affect the choice of buffer.

Suitable buffer salts for use according to the invention are for example tri- and disodium citrate, tripotassium citrate, trisodium phosphate, potassium tartrate, sodium acetate and sodium lactate. Sodium pyrophosphate may also be used but it tends to give a weaker gel. Monosodium citrate may also be used but since it tends to reduce the pH care must be taken to maintain the pH within the specified range. Use may also be made of salts of polyvalent metal ions, such as calcium or magnesium acetate, but is limited by the possibility of gel formation in the low methoxyl pectin sugar mixture before adding to the milk, by the calcium tolerance of the sample of low methoxyl pectin used and by the proportion of milk to low methoxyl pectin taken in the mixture. Accepting these limitations for the use of buffer salts, mixtures of buffer salts or buffer salts and alkali or acid may also be used to obtain the desired conditions.

The compositions of the present invention may include, as a flavour constituent, one or more fruit juices or comminuted fruit. The amount of fruit or juice wihch can be incorporated is variable and depends on the nature of the fruit in question. For example it is well-known that the polyvalent metal ion and buffer salt content of juices of various fruits is variable and one cannot, of course, add so much fruit or juice that gelling of the pectin takes place before addition of milk or that the buffer salt tolerance of the mixture is exceeded. The amount of fruit or juice to be added in any case, therefore, must be determined by experiment having regard to compatibility as well as to taste and flavour requirements. In general the quantity of fruit or fruit juice which can be tolerated is somewhat limited. In addition to fruit or fruit juices the composition may also contain flavourings other than fruit or juices such as true fruit esters and fruit concentrates. Where a savoury jelly is required suitable savoury flavourings may be used.

Sweetening agents which are used in the compositions according to the invention include particularly sucrose, but other suitable sweetening agents may be used such as other sugars, e.g. glucose, sorbitol or an edible sugar-containing compound, such as for example honey. When using sucrose I find that an amount of the order of 20% of this composition is desirable.

The quantity of water in the composition is important and must be fixed having regard to the volume of milk which is to be admixed with the composition in order to obtain a jelly. It is generally convenient to add a fixed quantity of milk to the composition (e.g. a volume equal to the volume of the composition used) and the volume of the composition must be such that having regard to the concentration of its constituents a jelly compound of the desired consistency results. With the preferred concentration of constituents hereinbefore mentioned a suitable total volume of composition is from 200–400 ml., preferably 250–350 ml. for making up to 1 imperial pint.

It will be understood that although when referring to "milk" in the specification I am referring to liquid milk which has not been decreased in volume to any material extent from its natural state, it is apparent that in place of liquid milk there may be used reconstituted dried milk and diluted evaporated or condensed milk although for best results the exact nature of the composition may require corresponding modification.

The composition according to the invention will normally be marketed in suitable containers, e.g. cans and will be made up into edible jellies by the consumer. The compositions will, therefore, in general require sterilisation which can be carried out by any convenient method. For example, when the compositions are to be marketed in cans, sterilisation can be effected by the methods used in ordinary fruit canning. In place of canning, the compositions may also be preserved by freezing, provided they are thawed out and allowed to warm up preferably to room temperature before use.

The actual making up of a milk jelly according to the invention in general takes place by admixing the composition preferably at about 10–30° C. with the appropriate quantity of milk and then mixing thoroughly; after a very short time the mixture rapidly thickens and as soon as it is well mixed can, if required, be transferred at once to a mould, which can be turned out after a very short time.

In order that the invention may be well understood, it will now be illustrated by the following examples:

Example 1

6.7 g. of commercial low methyl pectin (containing 70% i.e. 4.7 g. of low methyl pectin, MeO content 4.5 based on 100% calium pectate) was mixed with 80 g. of cane sugar and dispersed in 240 g. of distilled water, 1 ml. of vanilla flavouring and 0.7 ml. of yellow colour solution; the pH was adjusted to 4.0 with 7.0 ml. of 1% w./v. aqueous sodium acetate solution. The resultant solution was ready for use and could be stored by sterilisation and canning by ordinary fruit canning methods. The total quantity of fluid present was approximately 11 fluid ounces.

For making up, the whole of the above solution is mixed with an equal quantity of milk until thorough mixing is obtained and the mixture has thickened. The mixture is then transferred to a mould and turned out after the gel is well set and the shape of the mould has been taken. This may be as little as 10 minutes.

In this example it was found that the quantity of commercial low methyl pectin could be varied between 5.6 g. and 7.8 g. with quite satisfactory results. The pH could also be as low as 3.8 (which was the natural pH of the composition before adjustment) but this was found to be the borderline for gelling using spoon or fork mixing.

Example 2

6.7 g. of commercial low methyl pectin (containing 70% i.e. 4.7 g. of low methyl pectin, MeO content 4.5 based on 100% calcium pectate) was mixed with 87 g. of cane sugar and dispersed in 215 g. of distilled water and 1 ml. of strawberry colour. 28 g. of finely pulped strawberries, from which the coarse tissue had been removed by sieving, was added. The pH was adjusted to 4.30 with 8.0 ml. of 7% w./v. aqueous tri-sodium citrate solution. This was then ready for preservation and use as described in Example 1.

Example 3

3.0 g. of a low methyl pectin (MeO content 4.6 based on 100% calcium pectate) was mixed with 15 g. of cane sugar and dispersed in approximately 100 ml. of tap water. 25 g. concentrated tomato puree was added and the pH was adjusted to 4.36 with 10 ml. of 7% w./v. aqueous sodium citrate solution. By addition of tap water, the mixture was made up to a total weight of 245 g. The volume of the mix was approximately 8 fluid ounces and was ready for preservation as described in Example 1.

For making up, the whole of the above solution is taken, 6 fluid ounces of milk added and stirring carried out in an electrical mixer until thorough mixing is obtained and the mixture has thickened. The mixture can be moulded, if required, as described in Example 1.

Example 4

4.0 g. of low methyl pectin (MeO content 5.1 based on 100% calcium pectate) was mixed with 62 g. of cane sugar, dispersed in approximately 100 ml. of tap water. 0.10 ml. of raspberry flavour and 1.6 ml. of raspberry colour were added. The pH was adjusted to 4.17 with 2 ml. of 4% w./v. aqueous sodium hydroxide solution. By addition of tap water, the mixture was made up to a total weight of 245 g. The volume of the mix was approximately 8 fluid ounces and was ready for preservation as described in Example 1.

For making up, the whole of the above solution is taken and 8 fluid ounces of milk added with vigorous stirring with a spoon until thorough mixing is obtained and the mixture has thickened. The mixture can be moulded, if required, as described in Example 1.

Example 5

3.0 g. of a low methyl pectin (MeO content 4.6 based on 100% calcium pectate) was dispersed in approximately 100 ml. of tape water. 0.01 ml. of oil of celery and 0.3 ml. of yellow colour were added; the pH was adjusted to 4.40 by the addition of 17.4 ml. of 7.0% w./v. aqueous sodium citrate solution and 5.07 ml. of 10% aqueous citric acid, and the mixture was made up to a total weight of 245 g. by the addition of tap water. The volume of the final mixture was approximately 8 fluid ounces and was ready for preservation and use as described in Example 4.

Example 6

4.0 g. of a low methyl pectin (MeO content 3.5 based on 100% calcium pectate) was mixed with 62 g. of cane sugar dispersed in approximately 100 ml. of tap water. 50 g. of pasteurised comminuted orange juice and 1.5 ml. of orange colour were added and the pH was adjusted to 4.63 by the addition of 26 ml. of 7% w./v. aqueous sodium citrate solution. By the addition of tap water, the mixture was made up to a total weight of 245 g. and the volume of the mix was then approximately 8 fluid ounces. It was preserved by freezing. Complete thawing was effected and the mix brought up to room temperature before mixing with milk and preparing as in Example 1.

I claim:

1. An aqueous low methyl pectin-containing composition adapted to be made into a table jelly by simple admixture with a substantially equal volume of milk without heating comprising an aqueous solution containing from 0.8 to 1.8% by weight of low methyl pectin substantially completely dispersed therein, the methoxyl content of said pectin being within the range of from 3–6% based on 100% calcium pectate, the pH of said solution being within the range of from 4.0 to 4.5 and said solution also containing a member of the group consisting of sweetening and flavouring constituents.

2. The composition defined in claim 1 in which said solution also includes a buffer salt.

3. The composition defined in claim 1 comprising as flavour constituent a fruit flavour constituent.

4. The composition defined in claim 1 comprising sucrose as sweetening constituent.

5. The composition defined in claim 1 in liquid form.

6. The composition defined in claim 1 in frozen form.

7. The method of making a table jelly which comprises forming a mixture of milk and a substantially equal quantity of an aqueous solution comprising from 0.8 to 1.8% of a low methyl pectin substantially completely dispersed therein, the methoxyl content of said pectin being within the range of from 3–6% based on 100% calcium pectate, said solution also comprising a member of the group consisting of flavouring and sweetening constituents and the pH of said solution being within the range of from 3.4 to 5.5.

8. The method defined in claim 7 in which the pH of said pectin solution is within the range of from 4.0 to 4.5.

9. The method defined in claim 7 in which said mixture is formed at a temperature within the range of from 10–30° C.

References Cited in the file of this patent

UNITED STATES PATENTS

| | | |
|---|---|---|
| 2,540,545 | Pedersen | Feb. 6, 1951 |
| 2,559,338 | Barch | July 3, 1951 |
| 2,801,178 | Leo et al. | July 30, 1957 |